United States Patent [19]

Tsurumi et al.

[11] Patent Number: 4,633,965
[45] Date of Patent: Jan. 6, 1987

[54] MOTORCYCLE

[75] Inventors: Yasuyuki Tsurumi, Fujimi; Akio Matsuzaki, Asaka, both of Japan

[73] Assignee: Honda Giken Kogyo Kabushiki Kaisha, Tokyo, Japan

[21] Appl. No.: 647,775

[22] Filed: Sep. 6, 1984

[30] Foreign Application Priority Data

Sep. 6, 1983 [JP] Japan .................. 58-163813

[51] Int. Cl.$^4$ ............ B60K 11/00; B62D 61/02
[52] U.S. Cl. ...................... 180/229; 165/41; 165/42; 180/68.1; 180/68.4; 280/281 B; 296/78.1; 296/208
[58] Field of Search ............ 180/229, 218, 219, 225, 180/226, 228, 230, 54, 68.1, 89.1, 68.4; 165/41, 44, 51, 53, 54; 296/208, 78.1, 1 R; 280/281 B

[56] References Cited

U.S. PATENT DOCUMENTS

| | | | |
|---|---|---|---|
| 2,035,462 | 3/1936 | Courtney | 180/227 X |
| 4,445,587 | 5/1984 | Hillman | 180/229 |
| 4,478,306 | 10/1984 | Tagami | 180/229 |
| 4,479,676 | 10/1984 | Hayes | 296/78.1 |

FOREIGN PATENT DOCUMENTS

| | | | |
|---|---|---|---|
| 741411 | 5/1943 | Fed. Rep. of Germany | 180/68.1 |
| 892724 | 10/1953 | Fed. Rep. of Germany | 180/229 |
| 923595 | 2/1955 | Fed. Rep. of Germany | 296/78.1 |
| 477708 | 2/1953 | Italy | 180/229 |

Primary Examiner—John J. Love
Assistant Examiner—Mitchell J. Hill
Attorney, Agent, or Firm—Armstrong, Nikaido, Marmelstein & Kubovcik

[57] ABSTRACT

A motorcycle comprising an engine, a radiator mounted in front of the engine and a seat cowl mounted on the rear portion of the motorcycle, a guide member extends from the radiator to the seat cowl for guiding air from the rear of the radiator to the seat cowl. In one embodiment of the present invention, the guide member is a guide plate which forms a passage with a chamber cover. The air flow through the passage cools an engine exhaust chamber located in the passage. In an alternate embodiment, the guide member is a Y-shaped guide duct having a main body with an air intake located to the rear of the radiator and branched portions with exhaust ports located at the sides of the seat cowl.

8 Claims, 12 Drawing Figures

MOTORCYCLE

BACKGROUND OF THE INVENTION

1. Field of the Invention

The present invention relates to a motorcycle having an exhaust chamber arranged above an engine with an air guide plate for separating the exhaust chamber from the motorcycle engine carburetor and for guiding the air flow from the motorcycle radiator to the rear of the motorcycle. Further, the present invention relates to a motorcycle having an air guide duct for carrying air from the radiator to the rear of the motorcycle to improve the air resistance of the motorcycle.

2. Description of the Prior Art

In motorcycles having an exhaust chamber located above the engine and a fuel tank located below the engine, it is necessary to provide a shield for the heat of the exhaust chamber and to cool down the same, because a rider receives substantial heat from the exhaust chamber as compared to a motorcycle having the exhaust chamber located below the engine.

In a motorcycle having a water-cooled engine and a carburetor arranged behind the radiator, it is necessary to prevent the hot air, which has passed through the radiator, from flowing into the carburetor because the hot air will heat the carburetor and is sucked in by the carburetor.

Further, it is well known that the air resistance of a motorcycle body has large influences upon the running performance of the motorcycle. In a motorcycle which frequently runs at a high speed, such as a motorcycle for road races, it is necessary to lower the air resistance by such means as cowlings attached to the front and rear of the motorcycle body the cowlings being molded to have smooth outer surfaces.

Figure 1:
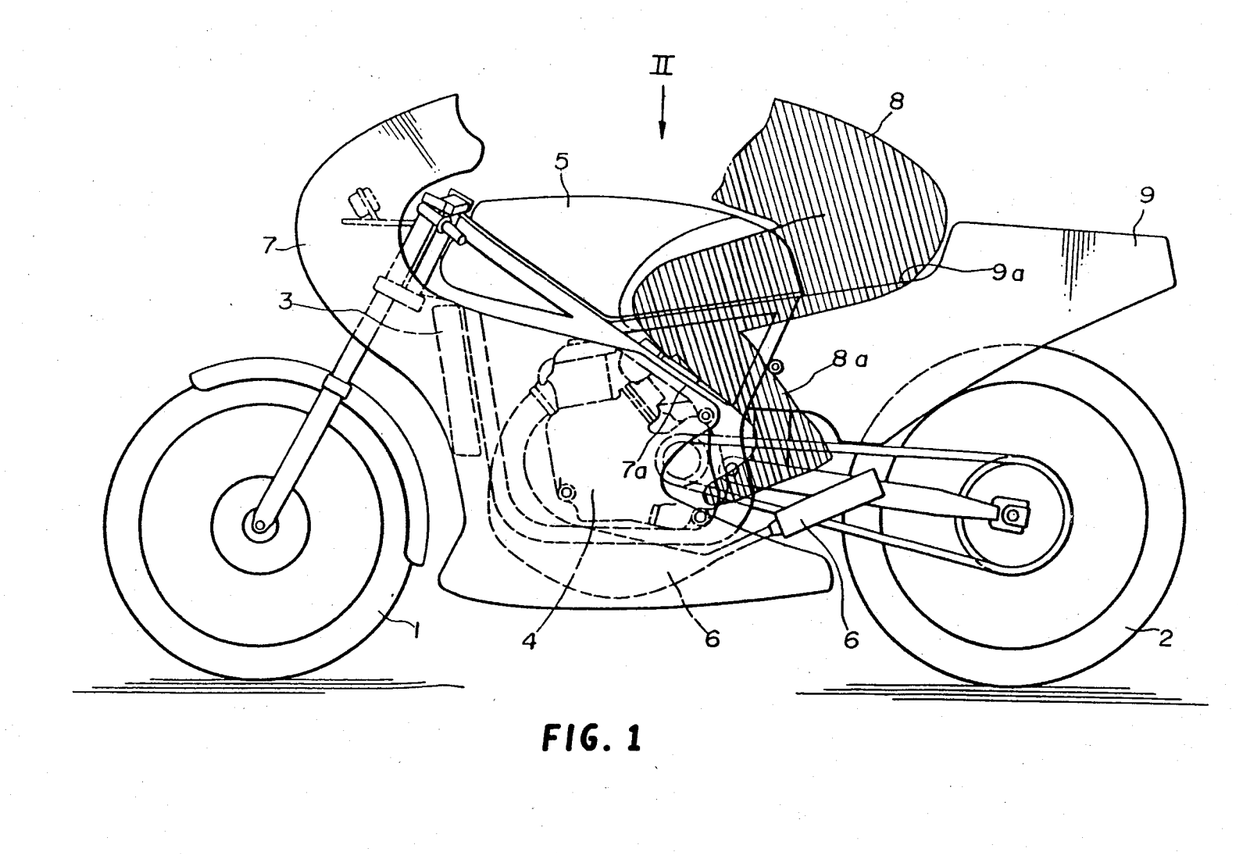
FIG. 1 is a side view of a prior art motorcycle.

FIG. 1 shows a conventional example of a road race motorcycle which is equipped with cowlings in the front and at the rear of the body so as to reduce the air resistance. This motorcycle is of the water-cooled type, in which a radiator 3 and an engine 4 are mounted between a front wheel 1 and a rear wheel 2. A fuel tank 5 is located above the engine 4, and an exhaust pipe 6 extends below the engine 4 to the rear of the motorcycle body. The front portion of the body, including the engine 4 and the radiator 3, is covered with a front cowling (which is referred to as a "front cowl") 7, and the rear of the fuel tank 5 is covered with a seat cowling (which is referred to as a "seat cowl") having a seat portion 9a on which is seated a rider 8. The air resistance is reduced by the two cowlings 7 and 9.

Figure 2:
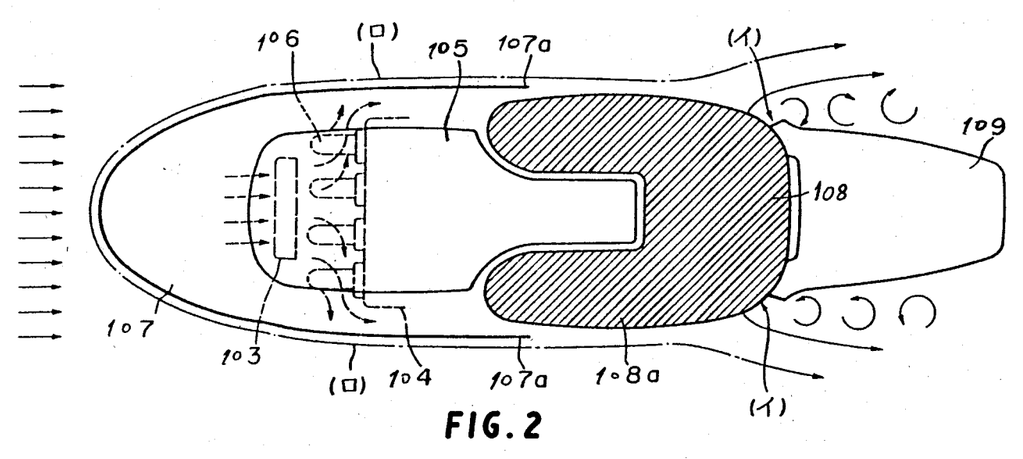
FIG. 2 illustrates air flow in the prior art motorcycle of FIG. 1.

The front cowl 7 has its side rear edges 7a extending to the vicinity of the front ends of the legs 8a of the rider 8, to cover the sides of the engine 4 and to have a width slightly larger than that between the two legs 8a of the rider 8. The seat cowl 9 is preferably narrow so as to facilitate the shift of the weight of the rider 8 to thereby improve riding stability and is usually made narrower than the width of the rider 8. If the seat cowl 9 is made narrower than the rider 8, however, as shown in FIG. 2, steps (λ) are formed at the back of the legs 8a of the rider 8 whereby boundary layers (□) of the air flow laminated at the sides of the front cowl 7 are separated at the rear of the legs 8a to establish vortexes behind of the legs 8a which can cuase air resistance.

In the motorcycle of the prior art, moreover, the flow directions of the slip streams (i.e., the air flow having passed through the radiator 3) of the radiator 3 are not especially controlled but are merely discharged in a natural manner from clearances between the front cowl 7 and the engine 4. In this discharging method, however, the slip streams of the radiator 3 impinge upon the engine 4, as shown in FIG. 2, so that the flow of the slip streams in the front cowl 7 become turbulent thereby increasing air resistance.

SUMMARY OF THE INVENTION

It is an object of the present invention to provide an air guide means between the exhaust chamber and carburetor of a motorcycle for separating the exhaust chamber from the carburetor.

It is another object of the present invention to provide an air guide means which defines at least one wall of an exhaust chamber of a motorcycle wherein the air guide means extends from the bottom of the motorcycle radiator such that cooling air from the radiator cools the exhaust chamber.

It is a further object of the present invention to provide an air guide means on a motorcycle having a front cowl and a seat cowl, wherein the air guide extends from the motorcycle radiator to the rear of the seat cowl.

It is still another object of the present invention to provide an air guide means for a motorcycle having front and rear seat cowls wherein the air guide means carries air from the radiator to the rear of the seat cowl in such a manner as to reduce turbulence and thereby reduce air resistance of the motorcycle.

The present invention is directed to a motorcycle comprising an engine, a radiator mounted in front of the engine and a seat cowl mounted on the rear portion of the motorcycle. A guide member extends from the radiator to the seat cowl for guiding air from the rear of the radiator to the seat cowl. In one embodiment of the present invention, the guide member is a guide plate which forms an exhaust chamber with a chamber cover. The air flow through the exhaust chamber cools an engine exhaust located in the exhaust chamber. In an alternate embodiment, the guide member is a Y-shaped guide duct having a main body with an air intake located to the rear of the radiator and branched portions with exhaust ports located at the sides of the seat cowl.

DETAILED DESCRIPTION OF THE PREFERRED EMBODIMENT

Figure 3:
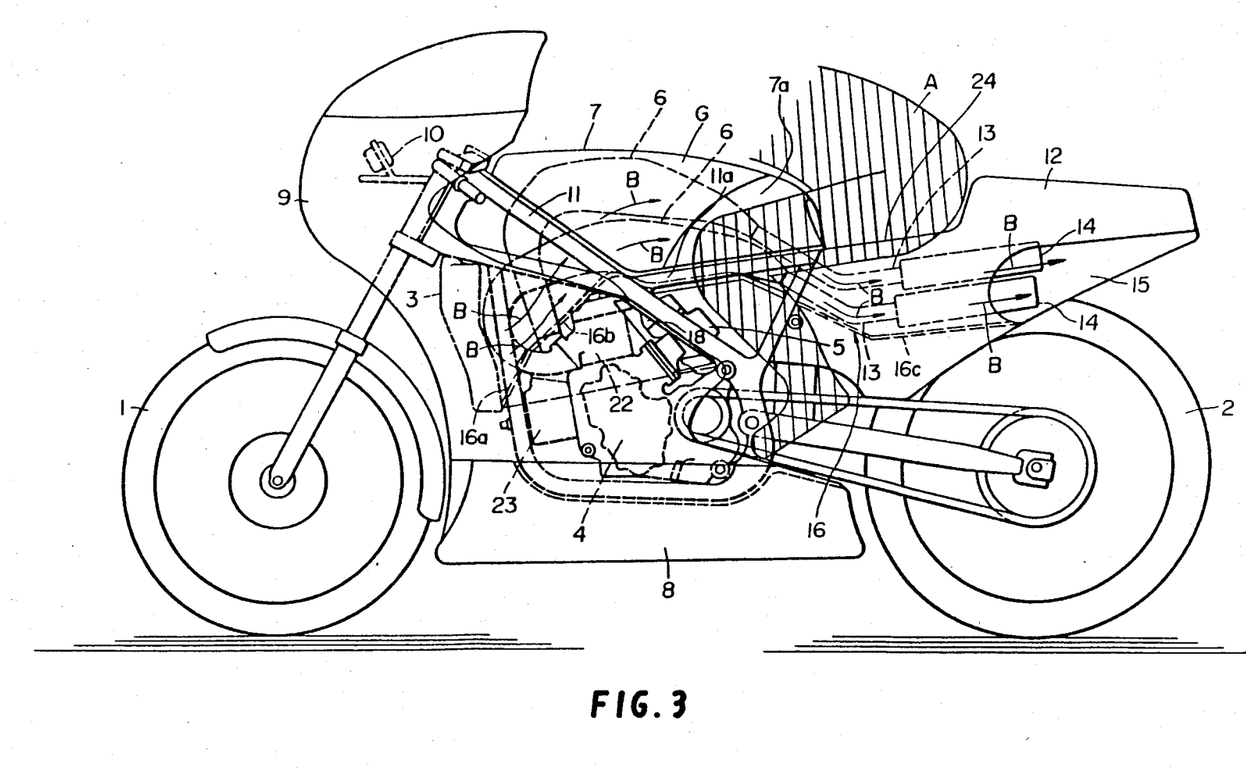
FIG. 3 is a side view of a motorcycle of one embodiment of the present invention.

FIG. 3 is a side elevation showing a motorcycle of one embodiment of the present invention. Radiator 3, an engine 4 and a carburetor 5 are mounted between a front wheel 1 and a rear wheel 2 of the motorcycle, with carburetor 5 positioned on the rear side of the engine. An exhaust chamber 6, located above the engine 4, is connected to the engine 4 and a chamber cover 7 covers the exhaust chamber 6. A fuel tank 8 is located below the engine 4. A front cowl 9 is disposed in front of the motorcycle body for laminating air flows during the running operation. The front cowl 9 is attached to a body frame 11 such that it is extended to cover the front of a tachometer 10 and the front portion of the engine 4 and is shaped to have a small air resistance. A seat cowl 12 is formed at its rear portion, with an opening 15 for exposing a muffler 14 connected to the exhaust chamber 6 through a tubular portion 13.

An air guide plate 16 is disposed in a space between the carburetor 5 and the exhaust chamber 6 and partitions the carburetor 5 and the exhaust chamber 6. The air guide plate 16 has one end 16a extending to the lower end of the radiator 3 to enclose the exhaust chamber 6 together with the chamber cover 7. The air guide plate 16 guides the air having passed through the radiator 3 into a passage G, which is enclosed by the air guide plate 16 and the chamber cover 7, to cool down the exhaust chamber 6 and to prevent the air from flowing into the carburetor 5. The air guide plate 16 comprises an air guide portion 16b which is shaped to rise from the lower end of the radiator 3 upward along the contour of the engine 4 and a partitioning portion 16c which extends to the rear from the upper end of that air guide portion 16b along the exhaust chamber 6, the tubular portion 13 and the muffler 14 to thereby partition the carburetor 5 and the exhaust chamber 6.

Figure 4:
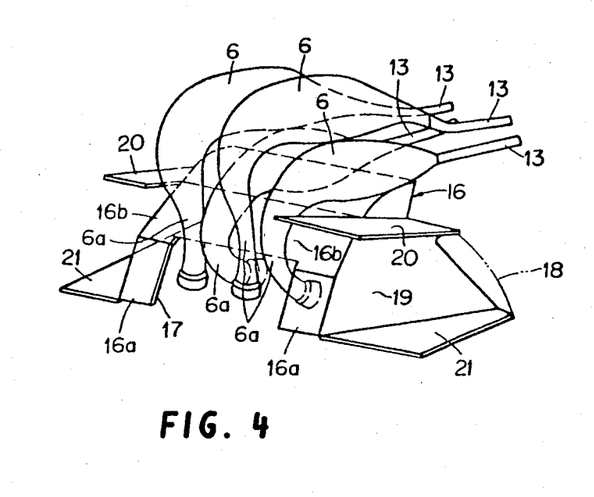
FIG. 4 is a perspective view of a portion of a guide plate of the present invention in relation to the engine exhaust system.
Figure 5:
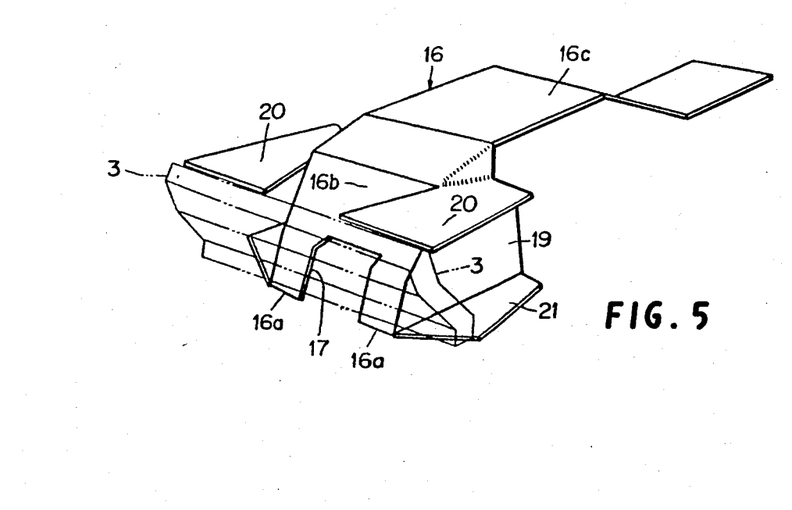
FIG. 5 is a perspective view of a guide plate of the present invention.

FIGS. 4 and 5 are perspective views showing the air guide plate 16. This plate 16 will be described in more detail with reference to those two figures. The portion 16b of the air guide plate 16 is formed at its lower end with a notch 17 for passing the connecting end 6a of the exhaust chamber 6 and at both of its sides with side plates 19 which extend to openings 18 acting as exits for the air flow in the front cowl 9. The side plates 19 are formed integrally at their upper and lower ends with top plates 20 and bottom plates 21 which define passages with the side plates 19 and cowl 9 for the air flow. The width of the wind guide portion 16b of the air guide plate 16 is smaller than that of the radiator 3, as shown in FIG. 5, and the sum of the width of that wind guide portion 16b and the upper plate 20 is substantially equal to that of the radiator 3. As a result, not all of the air guided to the air guide plate 16 through the radiator 3 is introduced into the passage G which is enclosed by the chamber cover 7 and the air guide plate 16, but the air required to cool down the exhaust chamber 6 is guided through the passage whereas the remaining air is discharged to the outside through the passages between the side plates 19 and the front cowl 9. This prevents the disadvantage that the flow velocity is increased to increase the air resistance which occurs when all the air having passed through the radiator 3 is introduced into the exhaust chamber 6.

Figure 8:
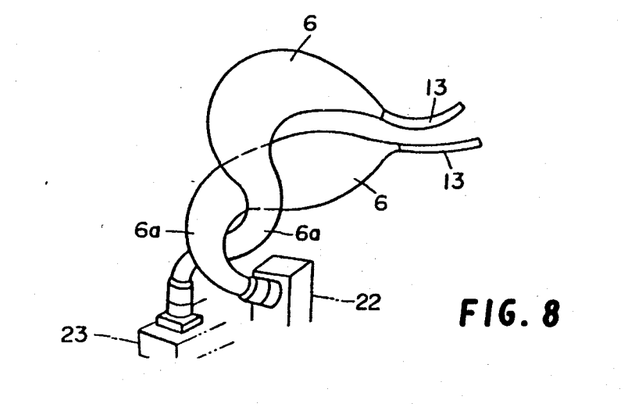

The engine 4 is a longitudinal V-shaped, two-cycle, four-cylinder type, as shown in FIG. 3, in which the front side cylinders 22 and rear side cylinders 23 are arranged in a right-angled V-shape, as shown, and are two in number in the transverse direction of the motorcycle body. The exhaust chambers 6 form a part of the exhaust system of the engine 4 such that their exhaust pipes are bulged and connected to the four cylinders 22 and 23. Moreover, the exhaust chambers 6 are positioned above the engine 4 and an upper frame 11a forming a part of the body frame 11. The tubular portions 13, connected to the exhaust chambers 6, are positioned to extend from the front to below the seat 24 and the mufflers 14 are positioned to extend from below to the back of the seat 24. Moreover, the exhaust chambers 6 are naturally bulged such that they do not affect the position of a rider and their bulging portions are positioned in front of knee-gripping recesses 7a formed in the chamber cover 7, i.e., in front of line X—X' of FIG 6. The exhaust chambers 6 may be positioned to satisfy the riding position, while satisfying the performance thereof, as shown in FIG. 8, by intersecting their connecting ends 6a to ensure their lengths and by terminating their largest-diameter portions in front of the line X—X' of FIG. 6.

The air guide plate 16 which partitions the carburetor 5 and the exhaust chambers 6 has one end 11a located at the rear of the radiator 3 to thereby guide the air having passed through the radiator 3 into the exhaust chambers 6. As a result, the exhaust chambers 6 are cooled down effectively by the air which passed through the radiator 3, and the carburetor 5 does not intake hot air so that the output of the engine 4 is not adversely affected. Specifically, the air which has passed through the radiator 3 is guided by the air guide portion 16b of the air guide plate 16 toward the passage G, which is enclosed by the chamber cover 7 and the air guide plate 16, as indicated at arrow B in FIG. 3, so that the air flows along the partitioning portion 16c, while cooling down the exhaust chambers 6, until it is discharged out of the opening 15 in the seat cowl 12 without being sucked into the carburetor 5.

Figure 6:
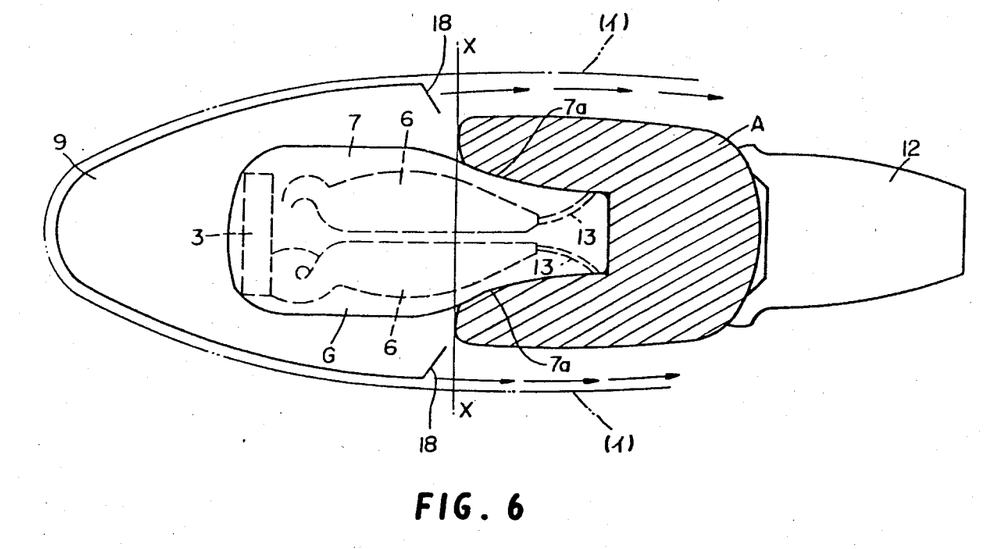
FIG. 6 is a schematic drawing illustrating air flow in a motorcycle of the present invention.
Figure 7:
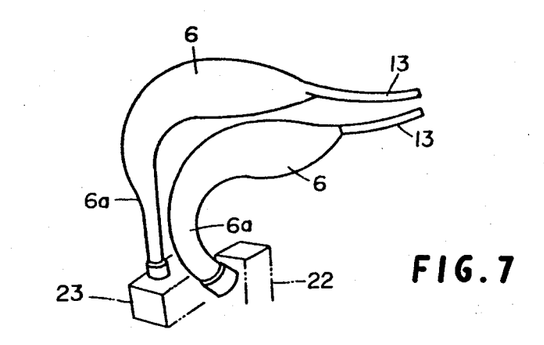
FIGS. 7 and 8 are perspective views of engine exhausts in motorcycles of the present invention.

The air flowing along the right and left sides of the radiator 3 is discharged from the openings 18 of the front cowl 9 through the holes, which are defined by the side plates 19, the top plates 20, the bottom plates 21 and the front cowl 9, as indicated by arrows in FIG. 6. As a result, this embodiment also has the function of stabilizing the air flow ($\lambda$) along the front cowl 9 without any separation. Moreover, all the air having passed through the radiator 3 is not used to cool down the exhaust chambers 6, but a portion of the same air is discharged from the openings 18 of the front cowl 9. As a result, the air resistance is not increased by the air guide plate 16.

According to this embodiment of the present invention, the air having been guided from the radiator by the air guide plate is introduced into the passage, which is enclosed by the chamber cover and the air guide plate, to cool down the exhaust chambers. As a result, the thermal influences upon the rider by the exhaust chambers of the motorcycle having the exhaust chambers positioned above the engine can be reduced to exhibit a heat shielding effect. There can be attained a variety of other excellent effects in which the hot air having passed through the radiator is not sucked into the carburetor and the influence upon the output of the engine by the hot air can be eliminated.

Figure 9:
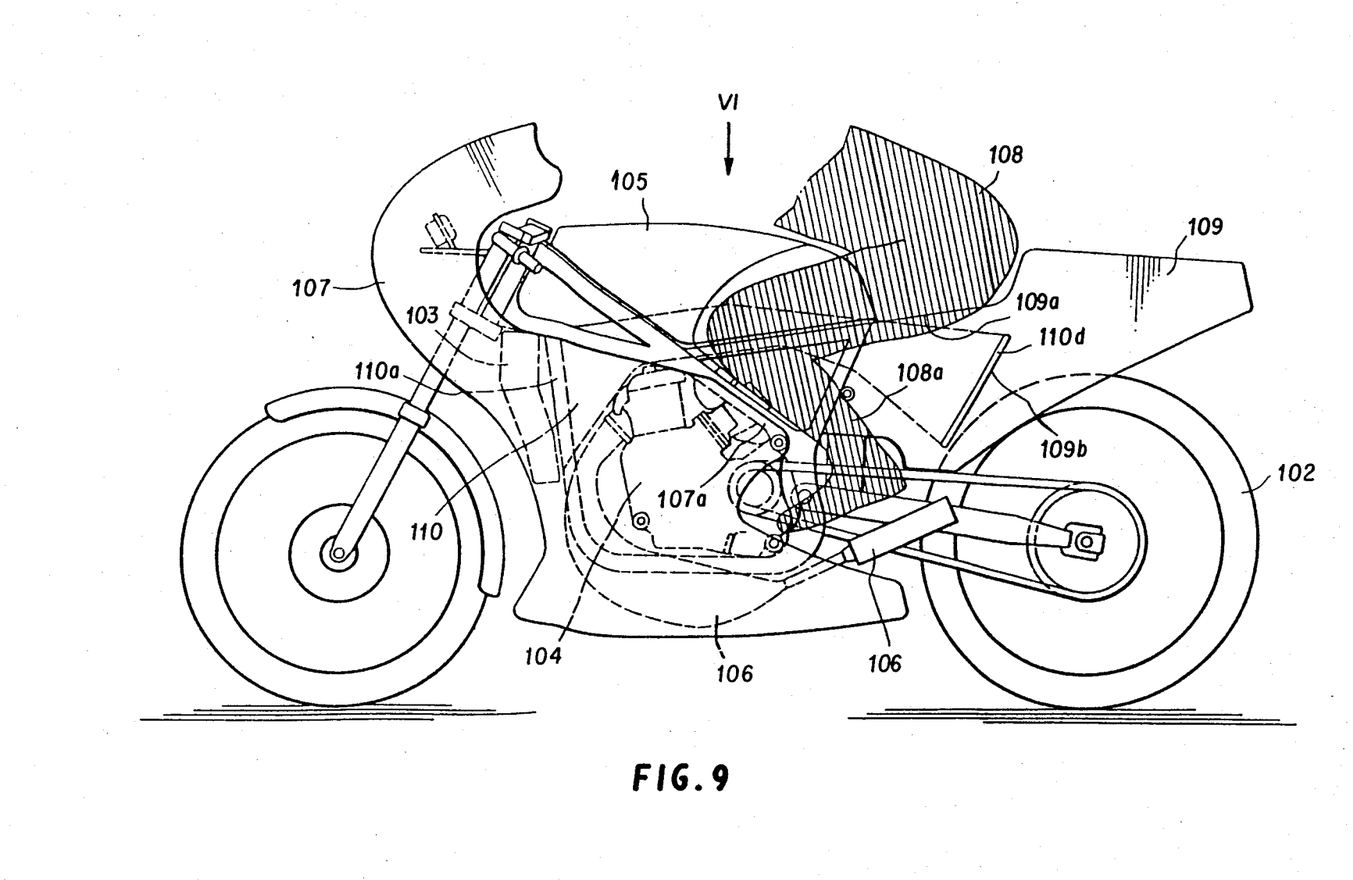
FIG. 9 is a side view of another embodiment of a motorcycle of the present invention.
Figure 10:
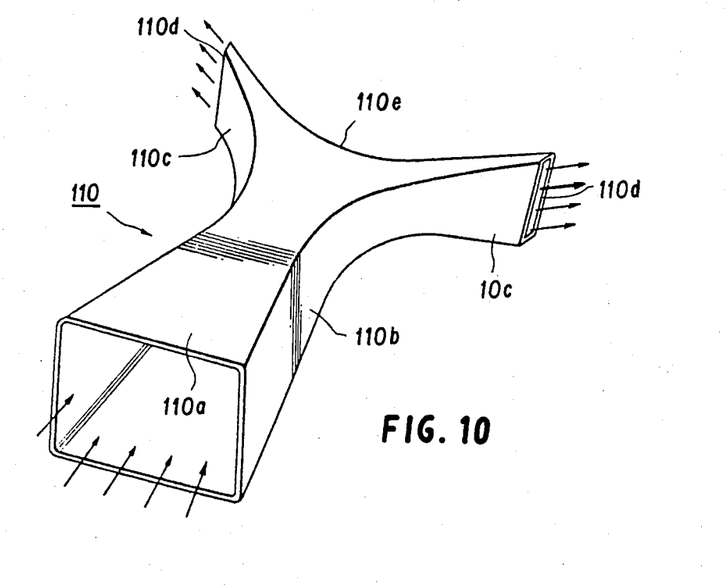
FIG. 10 is a perspective view of an air guide duct of the present invention.
Figure 11:
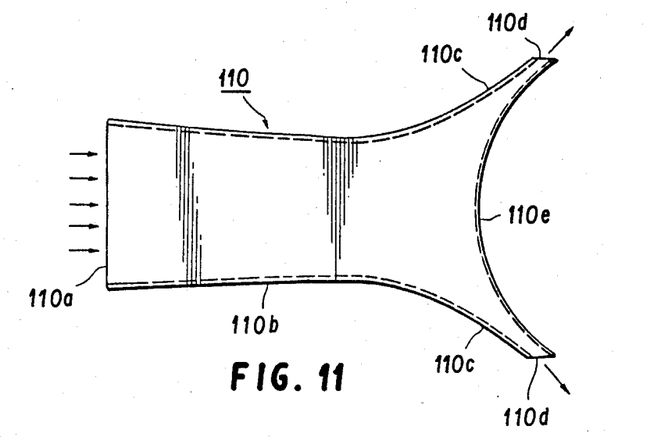
FIG. 11 is a plan view of an air guide duct of the present invention.

In the embodiment of FIGS. 9-11, the motorcycle includes a radiator 103 and an engine 104, which are mounted between a front wheel 101 and a rear wheel 102. The radiator 103 and engine 104 are covered with a front cowl 107, and a fuel tank 105 is positioned above the engine 104 and is covered with a seat cowl 109. An air guide duct 110 is located between the engine 104 and the fuel tank 105, the air guide duct 110 providing passages for the slip streams of the radiator 103.

The air guide duct 110 is branched generally into a "Y" shape, as shown in FIGS. 10 and 11, by bifurcating transversely (i.e., upward and downward in FIG. 11) the rear end of a main body 110b which has an air inlet portion 110a at its front end and extends rearwardly along the motorcycle body (i.e., rightwardly of FIGS. 9 and 11), and has outlet ports 110d at the rear ends of the respective branches 110c. The branches 110c are formed into a nozzle shape, in which the effective area is decreased gradually as they approach the rear ends. A rear wall 110e shunts the air coming from the inlet port 110a into the individual outlet ports 110d is curved to project towards the inlet port 110a. As shown in FIG. 9, the size of the individual portions are selected so that the inlet port 110a is close to the rear portion of the radiator 103 and the outlet ports opened at the side portions of the seat cowl 109, which are located at the rear of the legs 109a of a rider 108. The seat cowl 109 is formed with side portions, which correspond to the outlet ports 110d, with openings 109b corresponding to the shape of the outlet ports 110d so that the slip streams of the radiator 103 are discharged from the side portions of the seal cowl 109.

Figure 12:
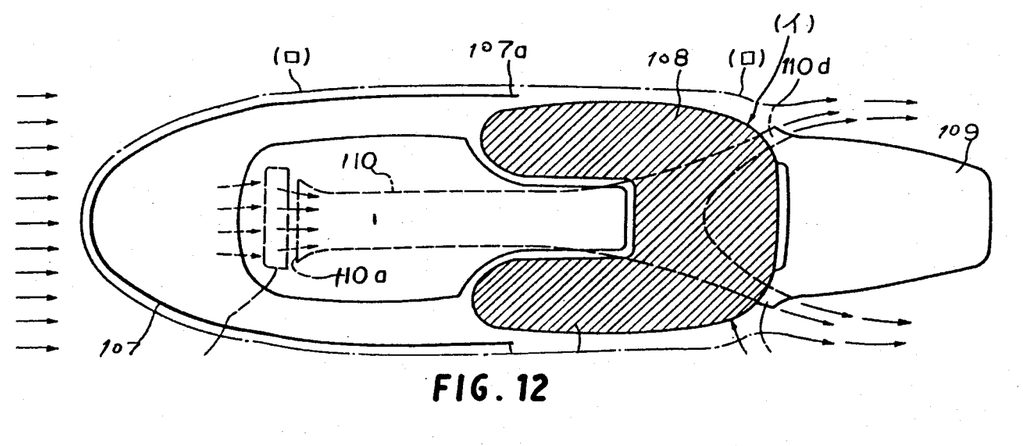
FIG. 12 is a top schematic view illustrating air flow in the other embodiment of the present invention.

In a motorcycle having the construction thus far described, as shown in FIG. 12, the slip streams of the radiator 103 are guided from the inlet port 110a into the air guide duct 110 and are smoothly discharged by the air guide duct 110, without any collision against the engine, until the air is discharged to the sides of the seat cowl 109. As a result, the slip streams of the radiator 103 are not disturbed in the front cowl 107 and thus, the air resistance which is caused by the slip streams of the radiator 103 is reduced.

Since the branches 110c have the outlet ports 110d formed into a nozzle shape, as shown in FIG. 12, the radiator slip streams are discharged from the outlet ports 110d in the form of jets, which will impart a new energy to boundary layers ($\square$) at the back of the legs 108a of the rider 108. As a result, even when the seat cowl 109 is made narrower than the rider 108 so that steps ($\lambda$) are formed at the back of the legs 108a of the rider 108, the separation of the boundary layers ($\square$) at the back of the rider 108 is substantially reduced so that the air flow at the sides of the seat cowl 109 is stabilized thereby reducing the air resistance at the rear of the rider 108.

In the embodiment thus far described, the rear wall 110e of the air guide duct 110 is curved towards the intlet port 110a so that the resistance to the radiator slip stream guided into the air guide duct 110 is reduced. However, the rear wall 110e should not be limited to that of the foregoing embodiment, but it is conceivable that the rear wall 110e can be folded towards the inlet port 110a.

As has been described hereinbefore, the motorcycle according to this embodiment of the present device is equipped with the air guide duct for discharging the radiator slip streams to the side portions of the seat cowl, which are located at the rear of the legs of the rider. Using this air guide duct, the radiator slip streams are smoothly discharged, without any collision against the engine, to the sides of the seat cowl. As a result, the radiator slip streams are not disturbed in the front cowl, but the air resistance caused by the radiator slip streams is reduced. Moreover, the outlet ports of the air guide duct are formed into a nozzle shape so that the radiator slip streams discharged from the outlet ports are jets which act upon the boundary layers of the air flow coming from the front cowl to thereby impart new energy to the boundary layers at the back of the legs of the rider. In other words, even when the seat cowl is made narrower than the rider, the separation of the boundary layers is substantially reduced to the rear of the rider so that the air flow at the sides of the seat cowl is stabilized. As a result, the air resistance can be reduced while allowing the seat cowl to be maintained in the preferred shape.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A motorcycle, comprising:
   an engine;
   an intake system including a carburetor positioned on the rear side of said engine;
   an exhaust system exiting from the front side of said engine;
   a radiator mounted in front of said engine for cooling said engine by water;
   a seat cowl mounted on the rear portion of the motorcycle including a seat for the rider, an upper plate behind said seat, and said plates extending downwardly from the sides of said upper plate and said seat; and
   an air guide means extending from said radiator into said seat cowl and passing above said engine for guiding air having passed through said radiator, from the rear of said radiator into said seat cowl, such that the air passes above said engine and does not interact with said engine, said air guide means including,
   (a) an inlet port receiving air having passed through said radiator, and being positioned between said radiator and said engine, and
   (b) exhaust ports communicating with said inlet port and being positioned in said side plates behind a rider for exhausting air from said air guide means through said side plates.

2. A motorcycle as set forth in claim 1, including a chamber cover means forming the top of said guide means, said chamber cover means and said guide means forming a passage, wherein the air flow through said passage cools an engine exhaust chamber located in said passage.

3. A motorcycle as set forth in any of claims 1 or 2, wherein said guide means includes a guide plate having a front portion positioned at a lower portion of said radiator.

4. A motorcycle as set forth in claim 3, wherein said guide plate includes a notch, the engine exhaust system extending from said engine into said passage through said notch; at least one side plate, and at least one top plate and bottom plate, said top plate, bottom plate and side plate forming a passage for carrying a portion of the air having passed through said radiator, said passage being separated from said exhaust chamber.

5. A motorcycle as set forth in claim 1, wherein said guide means comprises a main body portion and two branch portions extending from said main body portion, said exhaust ports being formed at the ends of said branched portions.

6. A motorcycle as set forth in claim 5, wherein said guide means is in a Y shape.

7. A motorcycle as set forth in claim 6, wherein said guide means includes a rear wall forming a portion of said branched portions, said rear wall having a projecting portion therein projecting towards said inlet.

8. A motorcycle as set forth in claim 1, wherein said exhaust ports are nozzles.

* * * * *